United States Patent [19]

Simmons, Sr. et al.

[11] 4,285,335
[45] Aug. 25, 1981

[54] SOLAR ENERGY COLLECTOR PANEL

[75] Inventors: William B. Simmons, Sr., Geneva; Derrick S. Ellis, Hartford, both of Ala.

[73] Assignee: Reliable Metal Products, Inc., Geneva, Ala.

[21] Appl. No.: 62,053

[22] Filed: Jul. 30, 1979

[51] Int. Cl.³ .......................... F24J 3/02; F28F 9/02
[52] U.S. Cl. ................................. 126/447; 126/448; 126/450; 165/175
[58] Field of Search .................... 165/175, 173, 178; 126/448, 450, 447, 417; 285/90, 92, 390

[56] References Cited

U.S. PATENT DOCUMENTS

| 310,375 | 1/1885 | Cannon | 165/175 |
|---|---|---|---|
| 310,633 | 1/1885 | Arci et al. | 165/175 |
| 323,235 | 7/1885 | Tompkins et al. | 165/175 |
| 1,389,997 | 9/1921 | Sedgwick | 165/175 |
| 2,180,854 | 11/1939 | Soule | 165/175 |
| 3,581,814 | 6/1971 | Jackson | 165/175 |
| 3,739,840 | 6/1973 | Jones | 165/175 |
| 4,011,856 | 3/1977 | Gallagher | 126/448 |
| 4,111,188 | 9/1978 | Murphy | 126/446 |
| 4,144,874 | 3/1979 | Zebuhr | 126/450 |
| 4,191,244 | 3/1980 | Keske | 165/175 |

Primary Examiner—Daniel J. O'Connor
Attorney, Agent, or Firm—Harvey B. Jacobson

[57] ABSTRACT

An elongated solar collector including a plurality of longitudinal side-by-side elongated panel sections having interconnected adjacent longitudinal marginal edges and including integral portions defining fluid passages extending longitudinally along the panel sections and opening endwise outwardly of the opposite ends of the panel sections. Elongated fluid inlet and outlet manifolds extend transversely of the opposite ends of the solar collector and across the opposite ends of the panel sections. The inlet and outlet manifolds include openings therein spaced longitudinally therealong and opening into the opposite ends of the aforementioned fluid passages and with the manifolds sealed relative to the ends of the passages. The panel sections include radiant energy absorbent sides and adjacent longitudinal marginal edges of the panel sections include integral flange portions, extending therealong and projecting outwardly from the aforementioned energy absorbent sides, secured together to form an integral panel assembly. The panel assembly is enclosed within an insulated housing having an open side outwardly through which the energy absorbent sides face and a light transparent cover is supported from the housing and extends across the open side thereof and is positioned for support from the outer extremities of the aforementioned flange portions.

8 Claims, 7 Drawing Figures

SOLAR ENERGY COLLECTOR PANEL

BACKGROUND OF THE INVENTION

With the increased interest in the development of solar collector panels in view of the recent worldwide need for harnassing power sources other than fossil and atomic power sources, many new types of solar energy collector panels have been developed and tested. Although different forms of solar energy collector panels utilizing circulatory heat transfer liquids function with different degrees of efficiency and considerable research and development is presently being undertaken to improve upon the efficiency of such solar energy collectors, present technology has developed numerous different forms of solar energy collector panels of the heat transfer fluid circulating type which are believed to be as reasonably efficient as present technology allows, but little development has been undertaken to provide a reasonably efficient solar energy collector panel which may be readily constructed from basic components in different sizes and capacities so as to enable standardization of the component parts utilized in the construction of different sizes and capacities of solar energy collector panels in the interest of maintaining the cost of the solar energy collector panels as low as possible. If the cost of solar energy collector panels in their present stage of development may be maintained as reasonably low as possible, considerably more solar energy collector panels will be placed in use and in turn more interest and concentrated effort in the research and development of more efficient solar collectors will be gained.

Examples of various forms of solar collectors including some of the structural and operational features of the instant invention are disclosed in U.S. Pat. Nos. 2,208,789, 2,122,821, 3,980,071, 3,987,784 and 4,011,856.

BRIEF DESCRIPTION OF THE INVENTION

The solar energy collector panel of the instant invention is constructed in a manner whereby the basic components thereof may be economically produced and the basic components may be readily cut to size and coupled together in order to form solar collectors of different sizes and capacities.

The main object of this invention is to provide a solar collector including basic components which may be readily increased in length and width and utilized to construct solar energy collectors of different sizes and shapes.

Yet another object of this invention is to provide a solar energy collector which is efficient in operation and which may be utilized in conjunction with various different forms of heat transfer circulatory fluids.

A further object of this invention is to provide a solar energy collector of the type utilizing heat transfer circulating fluid and constructed in a manner whereby the working components of the solar collector will be corrosion resistant.

Another object of this invention is to provide a solar energy collector designed in a manner whereby a majority of the major components thereof are, or may be made, commercially available.

Yet another object of this invention is to provide a solar energy collector constructed in a manner whereby side-by-side heat transfer circulating fluid passages are formed and the fluid passage forming components of the collector are interconnected through the use of a heat absorptive member from which collected radiant energy may be readily given off to the heat transfer circulating fluid.

Still another important object of this invention is to provide a solar energy collector including components thereof which may be readily assembled in order to form an efficient and reliable solar energy collector.

A final object of this invention to be specifically enumerated herein is to provide a solar energy collector in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged fragmentary vertical sectional view taken substantially upon the plane indicated by the section line 3—3 of FIG. 1;

FIG. 4 is a fragmentary vertical sectional view taken substantially upon the plane indicated by the section line 4—4 of FIG. 3;

DETAILED DESCRIPTION OF THE INVENTION

Figure 1:
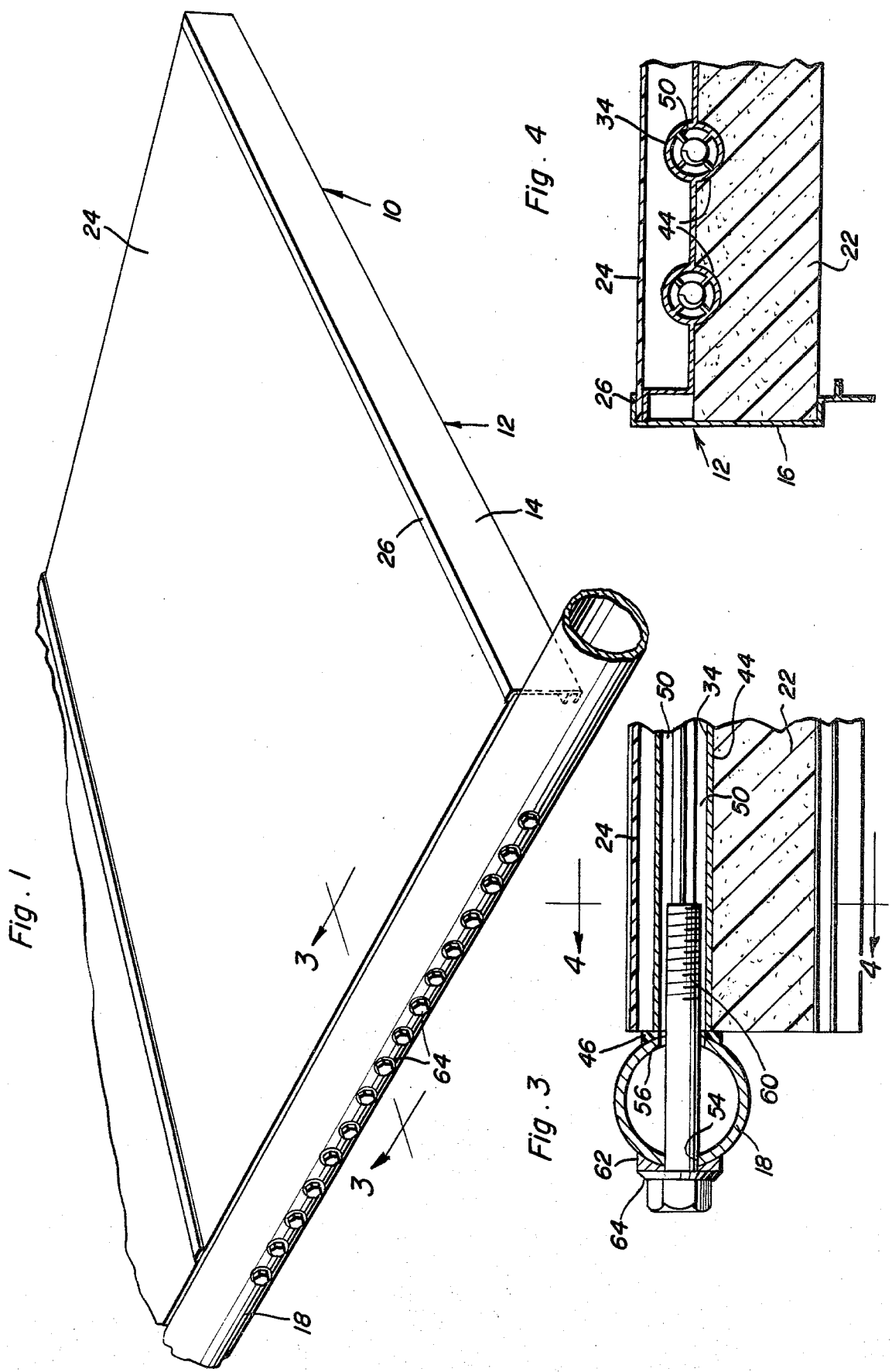
FIG. 1 is a fragmentary perspective view of a first form of solar energy collector constructed in accordance with the present invention.

Referring now more specifically to the drawings, the numeral 10 generally designates the first form of solar energy collector constructed in accordance with the present invention. The collector 10 includes a housing referred to in general by the reference numeral 12 and it may be seen from FIGS. 1 and 2 of the drawings that the housing 12 includes opposite longitudinal side members 14 and 16 and opposite end inlet and outlet manifolds 18 and 20, see FIG. 2.

The side members 14 and 16 may be suitable interconnected in any convenient manner (not shown) at points spaced therealong intermediate their opposite ends and the housing 12 includes a rear insulative filler panel 22 which extends between the side member 14 and 16 a spaced distance rearward of the front open side of the housing 12 defined between the side members 14 and 16 forward of the panel 22. The panel 22 may be constructed of any suitable insulative material such as urethane foam plastic or fiberglass and the open front of the housing 12 is closed by a transparent panel 24 of suitable material extending between the side members 14 and 16 and held captive beneath inturned flanges 26 carried by the forward edge portions of the side members 14 and 16.

The solar energy collector additionally includes a plurality of longitudinal side-by-side elongated panel sections 28 and 30 of substantially identical construction. The panel sections 28 and 30 each include a generally planar panel 32 having integral transversely spaced and longitudinally extending parallel tube defining sections 34 supported therefrom. In addition, the opposite longitudinal edges of the panel sections 28 include inverted J-shaped flanges 36 while the longitudinal edges of the panel sections 32 include inverted J-shaped flanges 38. The J-shaped flanges 38 include latch flanges 40 which are not included on the J-shaped flanges 36 and the J-shaped flanges 38 are larger than the flanges 36 and embracingly receive the latter therein in order to lock the panel sections 28 and 30 together in side-by-side alternating relation. The interconnected panel sections 28 and 30 define a unitary panel assembly 42 and the panel assembly 42 extends fully between the side members 14 and 16 and the underside portions of the tube defining sections 34 are embracingly received in semi-cylindrical recesses 44 formed in the panel 22. In addition, the panel assembly 42 is received beneath the transparent panel 24 and underside of the transparent panel 24 rests upon the upper or front surfaces of the J-shaped flanges 38 in order to support the transparent panel 24 at points spaced intermediate the side members 14 and 16 throughout the entire length of the collector 10.

Corresponding ends of the panel sections 28 and 30 are aligned and an elongated gasket strip 46 is disposed over each set of corresponding ends of the panel sections 28 and 30 and has openings 48 formed therein registered with the interiors of the adjacent ends of the corresponding tube defining sections 34.

Figure 2:
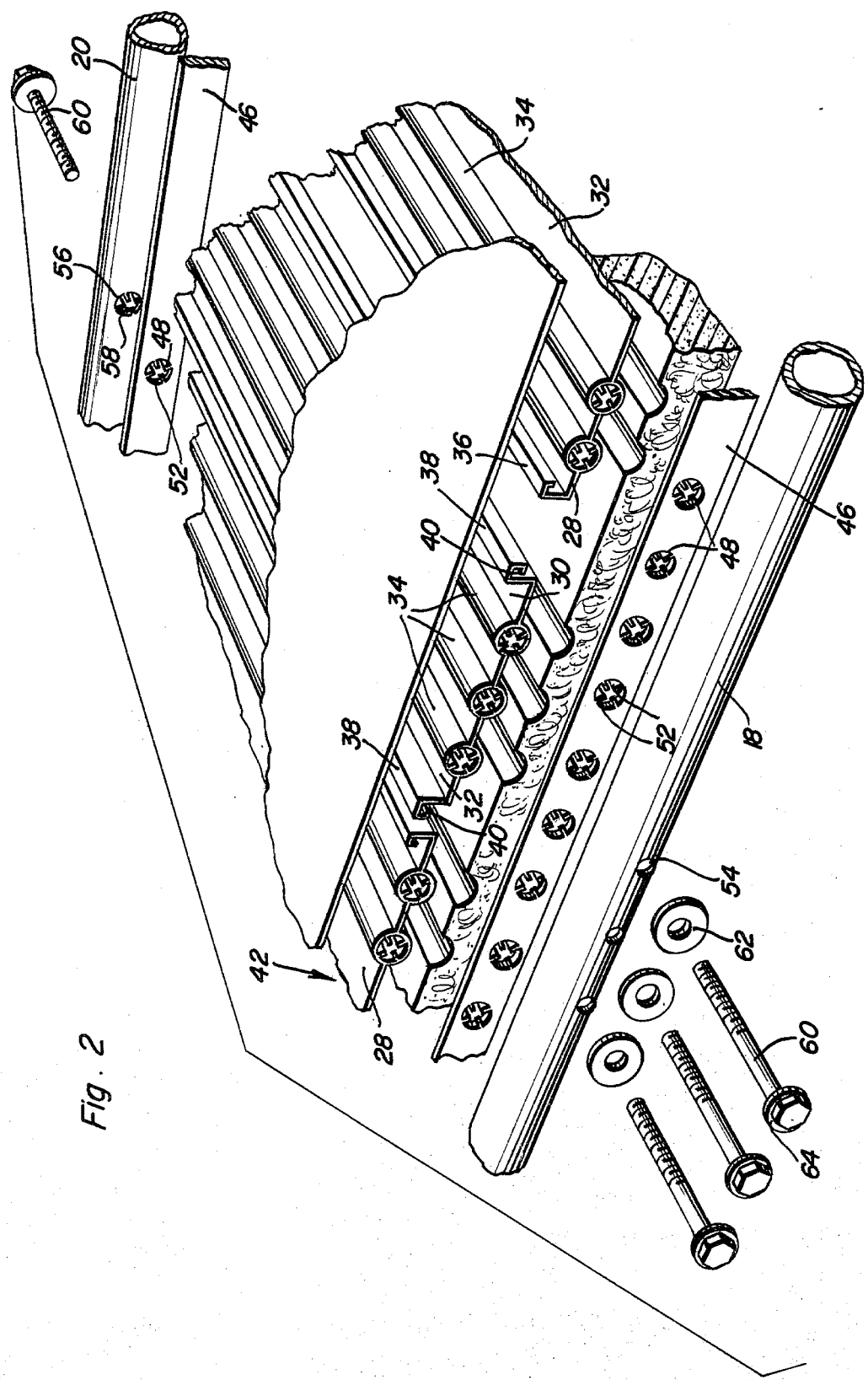
FIG. 2 is an exploded fragmentary perspective view illustrating the major components of the solar collector.

From FIG. 4 of the drawings, it will be noted that each of the tube defining sections 34 includes four equally angularly spaced radially inwardly projecting integral flanges 50 and it will be noted from FIG. 2 of the drawings that the gasket strips 46 include similar radially inwardly projecting ribs 52 in each opening 48, the ribs 52 being registered with the corresponding flanges 50.

The inlet and outlet manifolds 18 and 20 include diametrically opposite small and large bores 54 and 56 formed therein at points spaced therealong registered with the tube defining portions 34 and the large bores 56 include angularly spaced radial ribs 58 corresponding to and registered with the ribs 52. Solid attaching bolts 60 are passed through the bores 54 and 56 and are threadedly engaged with the inner ends of the radial flanges 50 of the tube defining sections 34 with resilient washers 62 being disposed on the bolts 60 between the enlarged heads 64 and the opposing sides of the manifolds 18 and 20 remote from the panel sections 28 and 30. In this manner, the inlet and outlet manifolds 18 and 20 are sealingly secured to the opposite ends of the solar collector 10 with the interiors of the manifolds 18 and 20 in sealed communication with the interiors of the tube defining sections 34.

Figure 5:
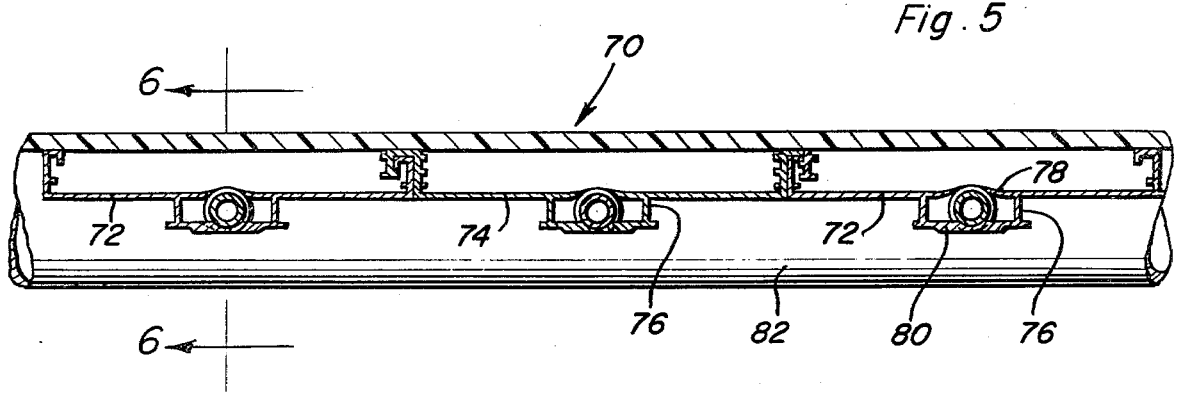
FIG. 5 is a fragmentary vertical sectional view similar to FIG. 4 and illustrating a second form of solar collector constructed in accordance with the present invention.
Figure 6:
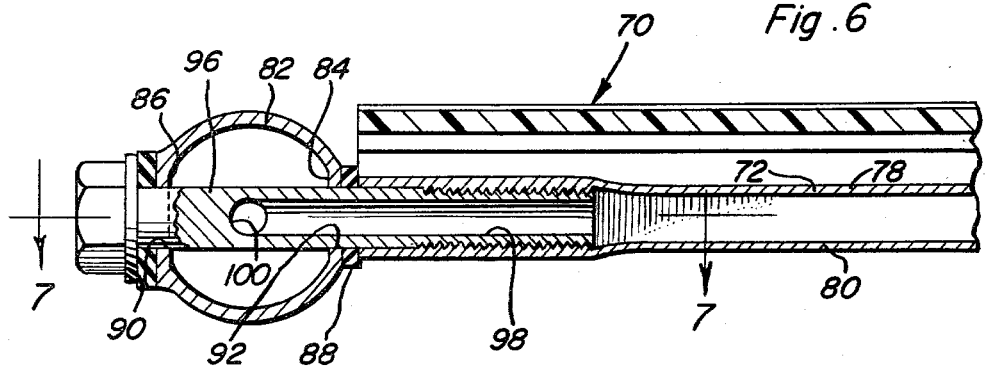
FIG. 6 is an enlarged fragmentary vertical sectional view taken substantially upon the plane indicated by the section line 6—6 of FIG. 5.
Figure 7:
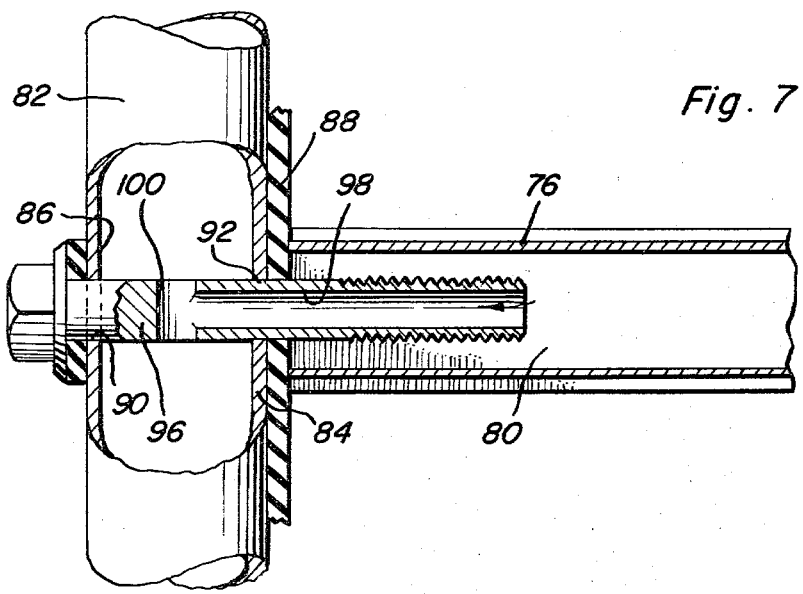
FIG. 7 is a fragmentary horizontal sectional view taken substantially upon the plane indicated by the section line 7—7 of FIG. 6.

With attention now invited more specifically to FIG. 5 of the drawings, there may be seen a modified form of solar energy collector referred to in general by the reference numeral 70 and which is in many respects similar to the solar collector 10. The solar collector 70 includes a housing corresponding to the housing 12 and a panel corresponding to the panel 22, but these components have been omitted for clarity purposes.

The solar collector 70 includes panel sections 72 and 74 corresponding to the sections 28 and 30, but the tube defining sections 76 thereof corresponding to the sections 34 define passages which are rectangular in cross section, the tube defining sections 76 including relatively thin and thick generally parallel remote wall portions 78 and 80. The collector 70 includes an inlet manifold 82 corresponding to the inlet manifold 18 (and also an outlet manifold, not shown) and the manifold 82 has a pair of diametrically opposite and generally parallel flattened sides 84 and 86. The side 84 opposes the corresponding ends of the sections 72 and 74 and a gasket strip 88 corresponding to the gasket strip 46 is disposed between the side 84 and the sections 72 and 74. The flattened sides 86 and 84 include longitudinally spaced bores 90 and 92 formed therethrough corresponding to the bores 54 and 56 and a plurality of bolts 96 including hollow shank portions 98 are secured through the bores 90 and 92 and threaded into the opposing central portions of the generally parallel wall portions 78 and 80 and thereby firmly secure the manifolds 18 and 20 to the opposite ends of the collector 70. In addition, each of the bolts 96 include a transverse passage 100 formed therethrough communicated with the hollow shank portions 98 and accordingly, the interior portions of the tube defining sections 76 are communicated with the interior of the manifold 82.

Thus, it may be seen that the collectors 10 and 70 are operative in generally the same manner. The upper surfaces of the panel sections 28 and 30 as well as the panel sections 72 and 74 may be coated with any suitable commercially available solar energy absorbing coating or coating material. Also, the various panel sections 28, 30 and 72, 74 may be of extruded aluminum and the bolts 60 and 96 at least slightly expand the internal transverse dimensions of those portions of the panel sections 28, 30 and 72, 74 with which the bolts 60 and 96 are engaged.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An elongated solar energy collector panel assembly including an elongated extruded metal planar panel section means for absorbing solar energy defining a plurality of individual, laterally spaced and open ended fluid flow tubular portions extending longitudinally along and opening endwise outwardly of opposite ends of said panel section with portions of said panel section extending between and interconnecting adjacent tubular portions of said panel section, elongated fluid inlet and outlet manifolds extending transversely of and across the opposite ends of said panel section, said inlet and outlet manifolds including openings therein spaced longitudinally therealong and opening into the corresponding opposite ends of said tubular portions with said manifolds sealed relative to the ends of said tubular portions, each of the opposite ends of said tubular portions including reduced internal width defining remote side portions, gasket means disposed between the opposite ends of said tubular portions and said manifolds, said gasket means comprising a one-piece member extending substantially the length of said manifolds and a plurality of attaching bolts secured transversely and passing entirely through each of said manifolds at points spaced longitudinally therealong and threadedly engaged with the inner portions of the remote side portions of said tubular portions.

2. The combination of claim 1 wherein said panel assembly includes a plurality of side-by-side panel sections including interconnected adjacent marginal edges, said panel sections including corresponding radiant energy absorbent sides, said adjacent longitudinal marginal edges of said panel sections including integral flange portions extending therealong and projecting outwardly from said energy absorbent sides and secured together to form an integral panel assembly, said panel assembly being enclosed within a housing having one open side outwardly through which said energy absorbent sides face, and a light transparent cover panel supported from said housing, extending across said open side and disposed for support from said flange portions.

3. The combination of claim 2 wherein said bolts include longitudinal passages formed therein opening endwise outwardly of one end thereof into the corresponding tube portion end and laterally outwardly thereof adjacent the other end into the interior of the corresponding manifold.

4. The combination of claim 3 wherein each of said tubular portions includes remote wall portions, said one ends of said bolts projecting into said tubular portions being externally threaded and threadedly engaged with said remote side portions.

5. The combination of claim 2 wherein said tubular portions are generally cylindrical and include a plurality of angularly spaced generally radially inwardly projecting flanges comprising said remote said portions, said ends of said bolts projecting into said tube portions being externally threaded and threadedly engaged with the radial innermost portions of the last mentioned flanges.

6. The combination of claim 2 wherein said housing includes insulated portions thereof insulating the side of said housing remote from said open side against heat loss therefrom.

7. The combination of claim 2 wherein said remote side portions comprise remote wall portions, said remote wall portions being slightly deformable away from each other and constructed of relatively soft metal and said bolts are wedgingly and threadedly engaged with the inner surfaces of said remote wall portions.

8. The combination of claim 2 wherein the integral flange portions of adjacent marginal edges of said panel sections are interlocked with each other to prevent relative lateral shifting of adjacent panel sections independent of relative angular displacement of said adjacent panel section.

* * * * *